United States Patent
Thomson et al.

(10) Patent No.: US 7,734,296 B2
(45) Date of Patent: Jun. 8, 2010

(54) MANAGEMENT OF DISTRIBUTED LOCATION SERVERS

(75) Inventors: Allan Thomson, Pleasanton, CA (US); Bhautik Doshi, Fremont, CA (US); Emilio Maldonado, San Jose, CA (US); Madhavi Vulpala, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 569 days.

(21) Appl. No.: 11/556,868

(22) Filed: Nov. 6, 2006

(65) Prior Publication Data

US 2007/0281707 A1 Dec. 6, 2007

Related U.S. Application Data

(60) Provisional application No. 60/809,669, filed on May 31, 2006.

(51) Int. Cl.
  H04W 4/00 (2009.01)
  H04W 24/00 (2009.01)
  H04W 40/00 (2009.01)
  H04W 72/00 (2009.01)
  H04L 12/28 (2006.01)
  H04B 1/00 (2006.01)
  H04B 15/00 (2006.01)
  G06F 17/30 (2006.01)
  G06F 17/00 (2006.01)

(52) U.S. Cl. .............. 455/446; 455/423; 455/422.1; 455/453; 455/63.1; 370/338; 370/254; 370/255; 370/256; 370/257; 370/328; 370/258; 707/10; 707/100

(58) Field of Classification Search ............. 455/423, 455/447, 404.2, 456.1, 456.5, 457, 63.1, 455/422.1, 446, 453; 370/338, 254–258, 370/328; 707/10, 100

See application file for complete search history.

(56) References Cited

U.S. PATENT DOCUMENTS 5,564,071 A * 10/1996 Liou et al. ............. 455/520

(Continued)

OTHER PUBLICATIONS

Dan Simone, 802.11k makes WLANS measure up, Network World, Mar. 29, 2004, www.networkworld.com/news/tech/2004/0329techupdate.html.

(Continued)

*Primary Examiner*—George Eng
*Assistant Examiner*—Wesley L Kim
(74) *Attorney, Agent, or Firm*—Baker Botts L.L.P.

(57) ABSTRACT

In one embodiment, a method includes storing, in a data store, a physical network model of a network environment, the network environment comprising one or more central controllers and one or more access points each operative to associate with a central controller, the physical network model comprising one or more region objects, each region object corresponding to a physical region of the network environment, each region object further including one or more radio frequency (RF) coverage maps, each RF coverage map defining a location of one or more access points and RF properties of a physical space; receiving a first mapping definition between a location server and a one or more region objects of the physical network model; receiving a second mapping definition between the location server and one or more central controllers; transmitting the one or more region objects in the first mapping definition to the location server; and configuring the location server and the one or more central controllers in the second mapping definition to interoperate.

23 Claims, 10 Drawing Sheets

U.S. PATENT DOCUMENTS

| | | | | |
|---|---|---|---|---|
| 5,960,439 | A * | 9/1999 | Hamner et al. | 707/103 R |
| 6,463,427 | B1 * | 10/2002 | Wu | 707/3 |
| 7,212,837 | B1 * | 5/2007 | Calhoun et al. | 455/560 |
| 7,433,696 | B2 * | 10/2008 | Dietrich et al. | 455/456.2 |
| 7,457,262 | B1 * | 11/2008 | Doshi et al. | 370/328 |
| 2003/0140132 | A1 * | 7/2003 | Champagne et al. | 709/223 |
| 2004/0083281 | A1 * | 4/2004 | Makagon et al. | 709/223 |
| 2005/0066014 | A1 * | 3/2005 | Willehadson et al. | 709/220 |
| 2005/0073980 | A1 * | 4/2005 | Thomson et al. | 370/338 |
| 2006/0268765 | A1 * | 11/2006 | Bajic et al. | 370/328 |

OTHER PUBLICATIONS

Muthukrishnan, et al., WLAN Location Sharing Through a Privacy Observant Architecture, University of Twente, Computer Architecture Design and Test for Embedded systems Group (Oct. 2005).

* cited by examiner

All Location Servers > Synchronize WCS and Location Servers

Action

| Synchronize | Network Designs |

| Network Designs | Location Servers Assigned | Sync. Status | Message | |
|---|---|---|---|---|
| Cisco_Campus | -- Unassigned -- | | | Assign |
| Network_Design_1 | -- Unassigned -- | | | Assign |
| WNBU | -- Unassigned -- | | | Assign |

[ Synchronize ] [ Reset ] [ Cancel ]

All Location Servers > Synchronize WCS and Location Servers

Action

| Synchronize | Controllers |
|---|---|

| Controllers | Location Server Assigned | Sync. Status | Message |
|---|---|---|---|
| CJ-4402 (172.19.35.26) | ls-emaldona | | Element found in Location Server, please discover the Controller first in WCS. |
| Cisco_1d:a6:a3 (10.32.32.19) | ls-sanity | | Element found in Location Server, please discover the Controller first in WCS. |
| Cisco_32:1b:23 (10.32.32.4) | ls-sanity | | |
| Cisco_40:09:e0 (10.32.34.4) | ls-sanity | | |
| Cisco_40:09:e0 (10.32.32.7) | ls-emaldona | | Element found in Location Server, please discover the Controller first in WCS. |
| Cisco_40:dc:23 (172.19.35.46) | ls-emaldona | | Element found in Location Server, please discover the Controller first in WCS. |
| Cisco_47:91:c0 (172.19.28.47) | ls-emaldona | | Element found in Location Server, please discover the Controller first in WCS. |
| Cisco_ca:d9:87 (10.32.32.29) | ls-sanity | | |
| Cisco_ca:f1:27 (10.32.32.23) | ls-sanity | | |
| Cisco_fc:20:e0 (10.32.32.9) | ls-sanity | | |

Fig._9

MANAGEMENT OF DISTRIBUTED LOCATION SERVERS

CROSS-REFERENCE TO RELATED APPLICATIONS AND PATENTS

This application claims priority to U.S. provisional patent application Ser. No. 60/809,669, filed May 31, 2006.

TECHNICAL FIELD

This disclosure relates generally to deployment of location servers in network environments.

BACKGROUND

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network. Enterprises are increasingly deploying location servers to track and provide the location of wired and wireless clients, for such purposes as e911, RF firewalls systems, and the like. Deployment of location services in a network across a large enterprise or across multiple sites in a distributed and managed fashion presents certain challenges, especially as an enterprise grows a network, deployment of location services may become a management problem.

DESCRIPTION OF EXAMPLE EMBODIMENTS

A. Overview

Particular embodiments of the present invention provide configuration models and synchronization schemes to facilitate management of multiple location servers in a network deployment. In one implementation, a network management server may store a physical network model of a network environment, which may include a network design mapping that maps physical elements (e.g., buildings, floors, etc.) and network elements (e.g., wireless access points) to one or more location servers. In one implementation, each location server may store a logical network model, which may include a central controller mapping that maps network elements (e.g., central controllers, wireless access points, etc.) to the location server. In one implementation, the network management server may also store the logical network models for the one or more location servers. In one implementation, the network management server may synchronize the physical and logical network models to reflect changes/updates, and then transmit or push the synchronization updates of the physical and logical network models to the appropriate location servers. In one implementation, the updates originating from logical network models at particular location servers may be received or pulled from those appropriate location servers in order to facilitate synchronization.

B. Example Wireless Network System Architecture

B.1. Network Topology

Figure 1A:
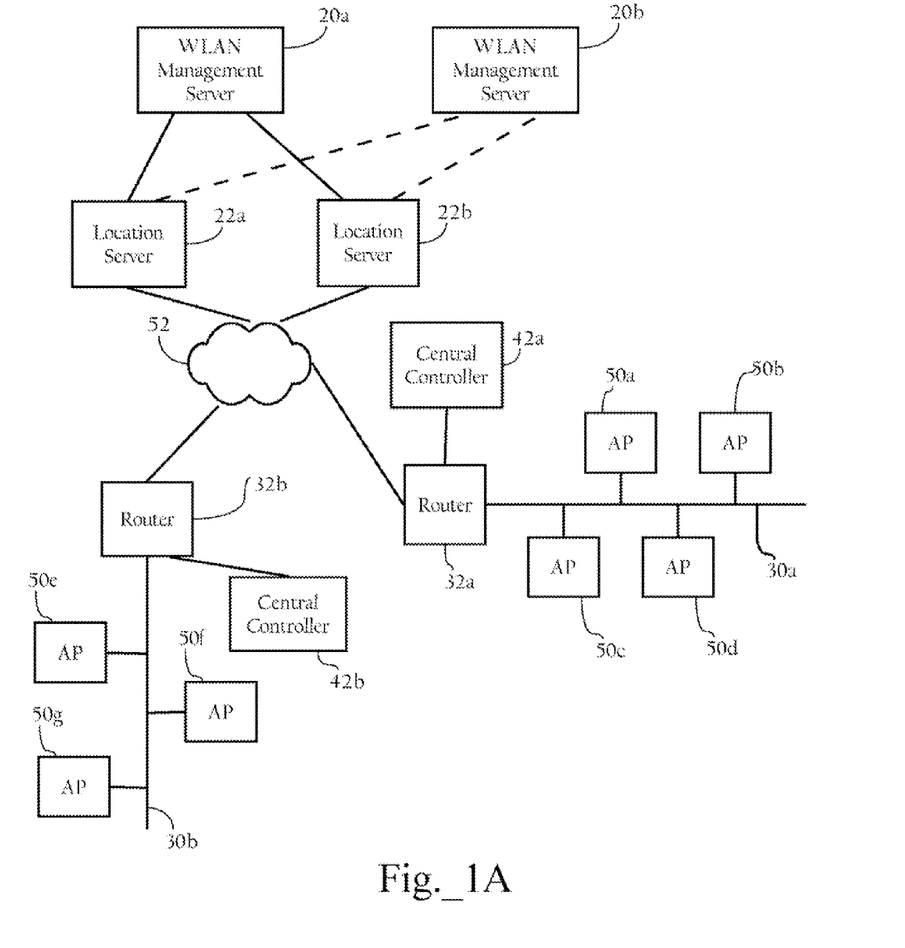
FIG. 1A illustrates example components in a wireless local area network (WLAN) system.

FIG. 1A illustrates example components in a wireless local area network (WLAN) system. In a specific embodiment of the present invention, the system includes one or more network management servers 20a and 20b, location servers 22a and 22b, and central controllers 42a and 42b, local area networks (LANs) 30a and 30b, routers 32a and 32b, and wireless access points 50a, 50b, 50c, 50d, 50e, 50f, and 50g. LANs 30a and 30b may be implemented by switches (or arrays of switches) and/or other network devices, such as bridges.

As FIG. 1A illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between network management servers 20a and 20b and wireless nodes via wireless access points 50. Of course, network 52 can include a variety of network segments, transmission technologies and components, such as terrestrial WAN links, satellite links, optical fiber links, and cellular links. Network 52 could also be a campus LAN. LANs 30a and 30b may be a LANs, LAN segments implemented by Ethernet switches (not shown), or arrays of switches having multiple ports to which wireless access points 50 are connected. The wireless access points 50 are typically connected to switch ports via Ethernet links; however, other link layer connection protocols or communication means can be employed. FIG. 1A illustrates one possible network environment in which the invention may operate; however, other implementations are possible. For example, although network management servers 20a and 20b may be on a different LAN or LAN segment, it may be co-located with wireless access points 50.

The wireless access points 50 are operative to wirelessly communicate with remote wireless nodes. In one implementation, wireless nodes may include notebook computers, personal digital assistants (PDAs), mobile phones, radio frequency identification (RFID) devices, etc. In one implementation, the wireless access points 50 implement the wireless network protocol specified in the IEEE 802.11 WLAN specification; of course, other wireless network protocols may be used. The wireless access points 50 may be autonomous or so-called "fat" wireless access points, or light-weight wireless access points operating in connection with a wireless switch (see FIG. 1B). In addition, the network infrastructure may also include a Wireless LAN Solution Engine (WLSE) offered by Cisco Systems, Inc. of San Jose, Calif. or another wireless network management system. In some implementations, the network infrastructure may also include one or more Wireless Control System (WCS) nodes operative to manage one or more wireless switches and access points.

B.2. Central Controller

Figure 1B:
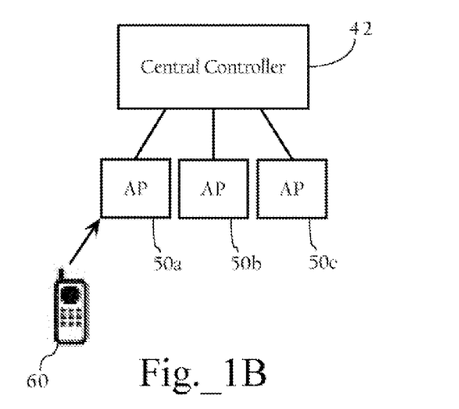
FIG. 1B illustrates an example hierarchical wireless network including a central controller.

FIG. 1B illustrates an example hierarchical wireless network including a central controller 42, which, in one implementation, may be used to implement central controllers 42a and/or 42b of FIG. 1A. In one implementation, the central controller 42 may be implemented as a wireless domain server (WDS) or, alternatively, as a wireless switch. If the central controller 42 is implemented with a WDS, the central controller 42 is operative to communicate with autonomous or so-called "fat" wireless access points. If the central controller 42 is implemented as a wireless switch, the central controller 42 is operative to communicate with light-weight wireless access points and process wireless protocol and network management information. As FIG. 1B illustrates, a central controller 42 may be directly connected to one or more access points 50. Alternatively, a central controller 43 may be operably connected to one or more access points over a switched and/or routed network environment, as FIG. 1A illustrates.

Figure 1C:
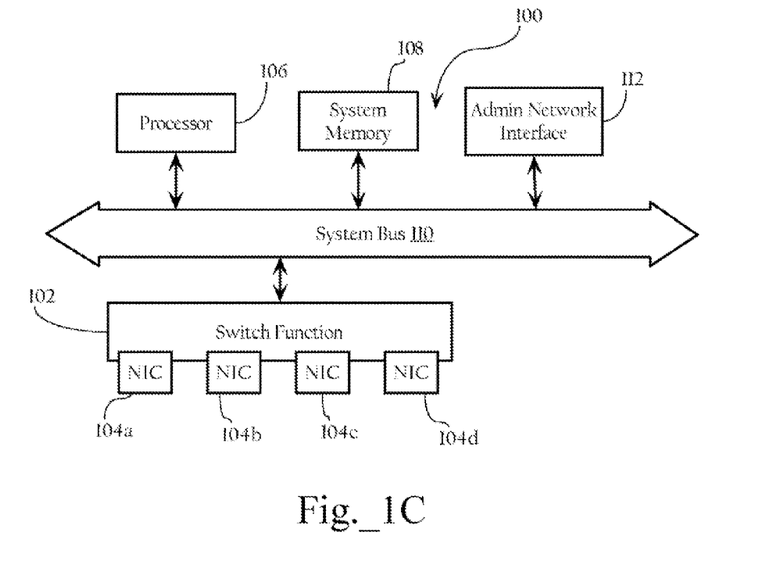
FIG. 1C illustrates an example hardware system, which may be used to implement a central controller.

FIG. 1C illustrates an example hardware system 100, which may be used to implement a central controller 42. As FIG. 1C shows, in one implementation, the central control elements each comprise a switch function or fabric 102 comprising a network interface 104a (e.g., an Ethernet adapter) for connection to network 52 and network interfaces 104b, 104c, and 104d for connection to wireless access points. This switch function or fabric is implemented to facilitate connection to the access elements. Central controller 42, in one implementation, further comprises a processor 106, a memory 108, one or more software modules stored in memory 108, including instructions for performing the functions described herein, and a system bus 110 operably connecting these components. The central control elements may optionally include an administrative network interface 112 allowing for administrative access for such purposes as configuration and diagnostic access. In other implementations, central controller 42 includes a single network interface.

B.3. Network Management Server or Location Server

Figure 2:
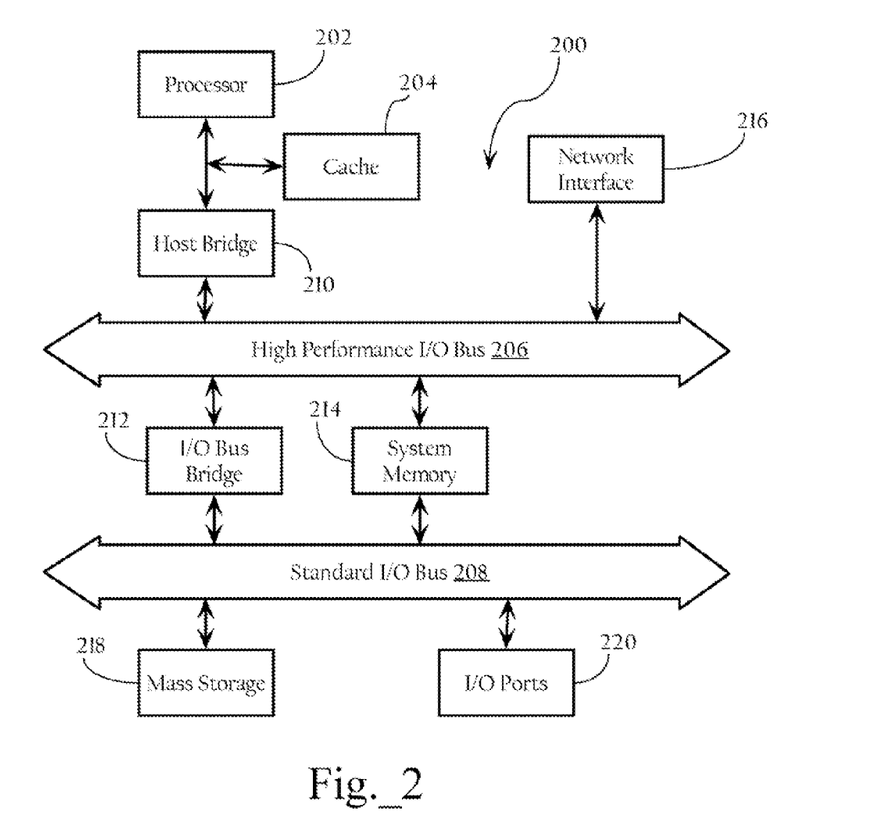
FIG. 2 illustrates an example hardware system, which may be used to implement a network management server.

FIG. 2 illustrates an example hardware system 200, which may be used to implement a network management server 20 and/or a location server 22. In one implementation, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist, with the components of hardware system 200 being coupled to the single bus. Furthermore, hardware system 200 may include additional components, such as additional processors, storage devices, or memories.

As discussed above, in one embodiment, the operations of the network management servers 20 and location servers 22 described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like.

B.4. Wireless Access Point

Figure 3:
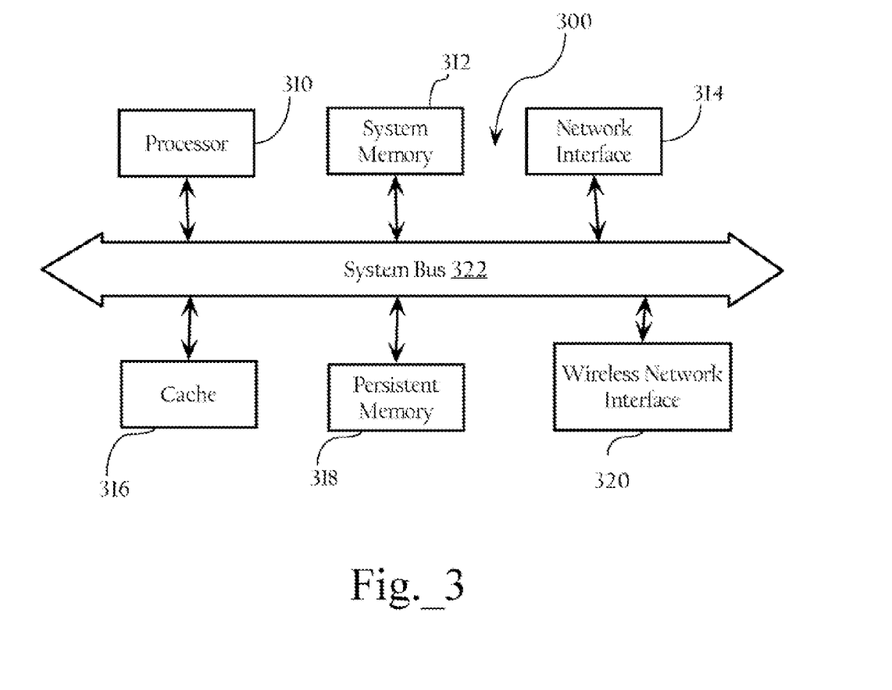
FIG. 3 illustrates an example hardware system, which may be used to implement a wireless access point.

FIG. 3 illustrates an example hardware system 300, which may be used to implement a wireless access point 50. In one implementation, the wireless access point 300 includes a processor 310, a memory 312, a network interface 314 (e.g., an 802.3 interface) for communication with a LAN, a cache 316 for storing WLAN information, a persistent memory 318, a wireless network interface 320 (e.g., an IEEE 802.11 WLAN interface) for wireless communication with one or more wireless nodes 60, and a system bus 322 interconnecting these components. The wireless access points 50 may also include software modules (including Dynamic Host Configuration Protocol (DHCP) clients, transparent bridging, Lightweight Access Point Protocol (LWAPP), Cisco® Discovery Protocol (CDP) modules, wireless access point modules, Simple Network Management Protocol (SNMP) functionality, etc., and device drivers (e.g., network and WLAN interface drivers) stored in persistent memory 318 (e.g., a hard disk drive, flash memory, EEPROM, etc.). At start up, these software components are loaded into system memory 312 and then accessed and executed by processor 310.

C. Basic Wireless Network Environment for Physical and Logical Network Models

C.1. Physical Network Model (Network Design)

Figure 4:
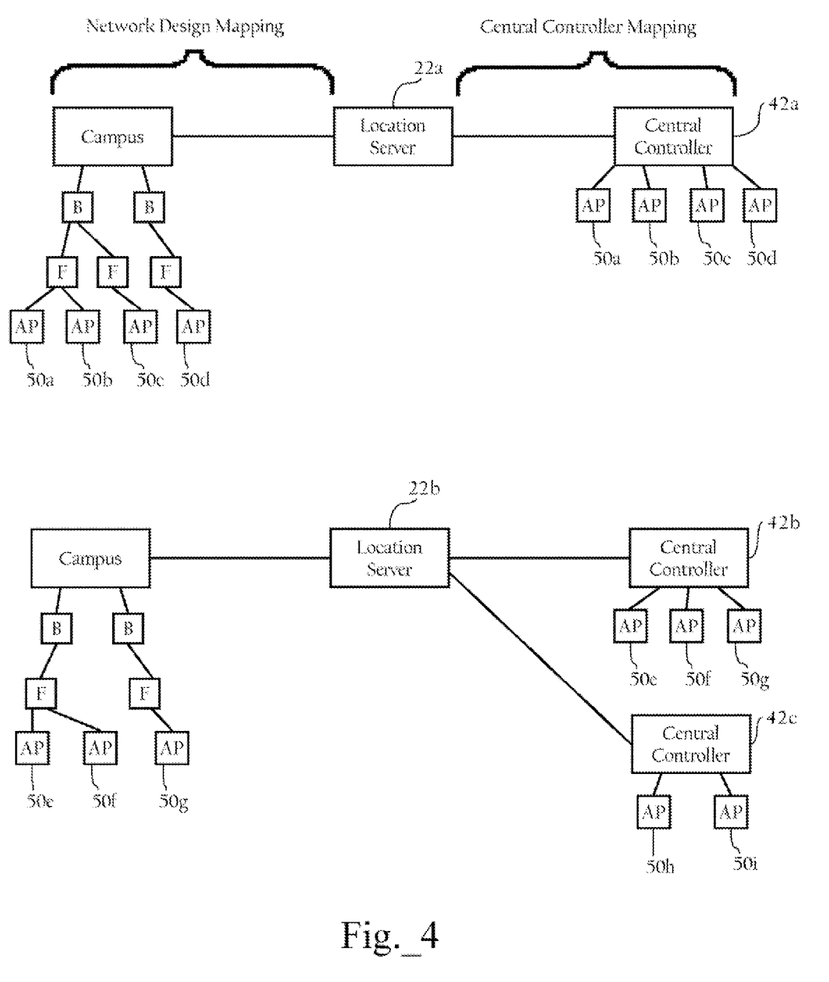
FIG. 4 illustrates an example network environment for physical and logical network models.

FIG. 4 illustrates an example physical and logical network models for a hypothetical network environment. In one implementation, a physical network model, also referred to as a network design, may include various synchronization objects. In one implementation, synchronization objects may include, for example, one or more region objects corresponding to physical regions of the network environment (e.g., building, floor, etc.), a network design mapping, and one or more network elements, such as one or more location servers 22, and one or more wireless access points 50. In one implementation, a physical space or campus may include physical elements such as buildings, floors, etc., and network elements, such as wireless access points, etc. For example, referring to FIG. 4, a given campus may include one or more buildings (each labeled "B") having one or more floors (each labeled "F"), and each floor may be associated with one or more wireless access points (each labeled "AP").

In one implementation, each physical region object may be initially unassigned to a location server. In one implementation, as a user assigns a given region object to a location server, a mapping definition (e.g., network design mapping and/or central controller mapping) may be defined between that object and a list of location servers to which it is mapped. In one implementation, such mappings may be stored in a data store or database with additional attributes for synchronization, as described in more detail below. The database may reside in any appropriate location such as at a network management server. Also, the network management server may share the physical network model, as well as the logical network model (described below), among other network management servers and one or more distributed location servers.

In one implementation, as FIG. 4 shows, a physical domain may be divided into one or more physical spaces or campuses, which may be assigned to one or more location servers. In one implementation, one or more campuses may be associated with a given location server, or one campus may be associated with multiple location servers. In one implementation, if a given campus is associated with multiple location servers, the location servers may be designated as primary, secondary, etc.

In one implementation, a building may have attributes such as dimensions, a civic address, and geographic reference points (for providing a geographic location). In one implementation, a floor may have attributes such as dimensions, graphical image of the floor, etc. A floor may include one or more coverage areas having various shapes, and may be associated with one or more wireless access points having positions on the floor plan, wireless access point types, antenna information, directions, etc. In one implementation, a floor may contain obstacles that may define any relevant radio frequency (RF) obstacles. Accordingly, in one implementation, the physical network model may have associated RF coverage maps. RF coverage maps, also referred to as a heat maps, may be derived from one or more access points, their locations, and RF properties of a physical space. In one implementation, the RF coverage maps may provide information regarding coverage of particular wireless access points. RF coverage maps are useful for assessing the area or region of sufficient WLAN service, and for use in locating wireless nodes. RF coverage maps are typically derived from manual site surveys and mathematical modeling techniques, such as ray tracing.

In one implementation, the network elements of the physical network model need not include central controllers, because while wireless access points may be logically associated with any number of controllers, their physical locations may remain the same.

In one implementation, a given physical network model may be assigned to one or more location servers. As such, multiple location servers may manage a single campus and the actual number of location servers required may depend on the size of the campus and the number of wireless nodes to be tracked. In one implementation, a given campus may be assigned to one or more location servers. As such, multiple location servers can have the same event definitions and look for those conditions across their respective domains.

Other synchronization objects may include event groups, event definitions, and event destinations. In one implementation, an event group may be define a set of event rules (e.g., for a logical group). In one implementation, an event group may include one or more event definitions. In one implementation, an event definition may define one or more triggers for automatic synchronization. In one implementation, a trigger may be any logical combination of triggers, where a logical expression of triggers is true before a message is generated for an event definition. In one implementation, an event definition may also have attributes for prioritization (e.g., evaluation order) between the definitions of a group, attributes for time-of-day enablement/disablement, and format attributes for messages generated (e.g., Extensible Markup Language (XML), plain text, etc.). In one implementation, an event destination may define one or more IP addresses, common message formats, and message transports. In one implementation, a message format may be XML, plain text, etc. In one implementation, a message transport may be either a Simple Network Management Protocol (SNMP) trap, a Simple Object Access Protocol (SOAP) call, a Simple Mail transfer Protocol (SMTP) email, a Syslog, or any other suitable message transport type.

C.2. Logical Network Model

In one implementation, the logical network model may include various objects. In one implementation, objects may include, for example, a central controller mapping and various network elements such as one or more location servers, one or more central controllers, and one or more wireless access points. In one implementation, location servers are logically associated with central controllers, and central controllers are logically associated with wireless access points.

In one implementation, a central controller may be assigned to one location server. As such, a single location server may be associated with that central controller. This may be done for performance reasons in order to avoid a central controller from becoming overwhelmed by location traffic. In other implementations, multiple location servers may manage the same central controller.

In one implementation, some network elements of the logical network model such as the location servers and wireless access points, may correspond to network elements of the physical network model. In one implementation, the logical network model is tracked separately from the physical network model. In one implementation, the logical network model may include a central controller definition, which may include one or more communication parameters that a location server may use to communicate with a central controller.

In one implementation, both the logical and physical network models may include attribute information for the various network elements. For example, location server attributes may include an Internet Protocol (IP) address, name, communication port, user/password credentials, etc. In one implementation, location servers store and track one or more central controller mappings, which include real time data (e.g., signal strength measurements, associated wireless access points). In one implementation, location server may also perform updates to the central controller mappings. As described in more detail below in connection to FIGS. 5 and 6, changes to the network in the physical domain (e.g., a wireless access point changes location) are subsequently reflected in the logical domain.

In one implementation, once the physical and logical models have been established, the network management server 20 manages/monitors the status of the location servers. As described in more detail below, the network management server 20 may then synchronize the models when changes occur.

D. Synchronization

In one implementation, during a synchronization process, the network management server 20 can synchronize the logical network model, and the physical network model and can push the updated/synchronized network models to the location servers. This enables changes to the logical and physical network models to be coordinated and pushed to the location servers in a single operation rather than multiple times for each individual location server. This also enables a user such as an administrator to define network designs once and use the design multiple times across multiple location servers. The following describes the synchronization process in more detail.

Figure 5:
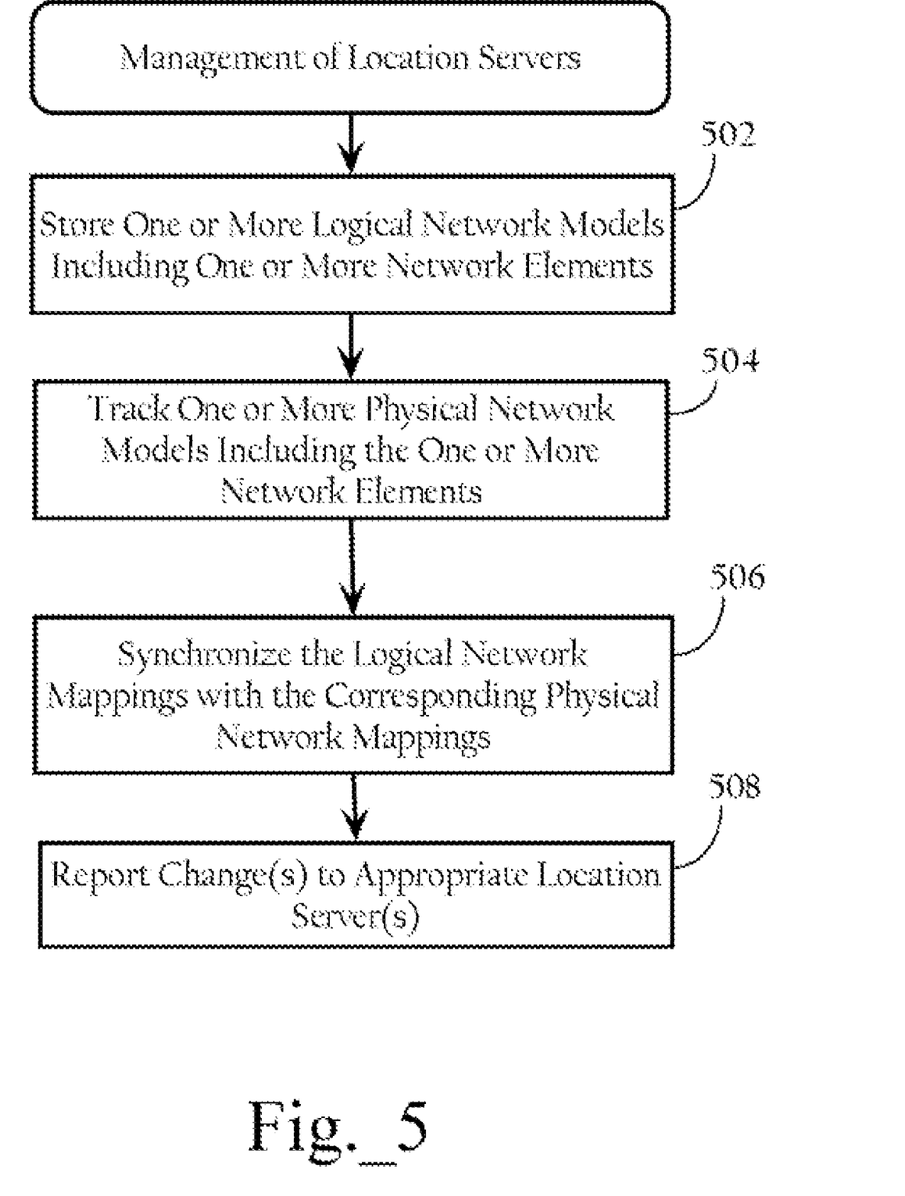
FIG. 5 illustrates an example method implemented at a network management server.

FIG. 5 illustrates an example method implemented at a network management server 20. As FIG. 5 shows, network management server 20 stores one or more logical network configuration models including one or more network elements in a data store. In one implementation, a logical network configuration model may include, for example, location servers, central controllers, wireless access points, etc. (502).

Network management server 20 tracks one or more physical network configuration models including the one or more network elements (504). In one implementation, the network elements of the physical network model may include geographical locations (e.g., campuses), location servers, wireless access points, etc. The one or more logical network models correspond with respective one or more physical network models. To track the physical network models, network management server 20 collects real-time data, which may include signal strength measurements, associated wireless access points, changes to the physical configuration, etc.

Network management server 20 synchronizes the logical configuration mappings (i.e., central controller mappings) with the corresponding physical configuration mapping (i.e., network design mappings) when one or more changes occur in either the logical or physical configuration mappings (506). One implementation of the synchronization process is described below in connection with FIG. 6. Network management server 20 then reports/pushes the change(s) to the location server(s) (508). In one implementation, when a given location server detects synchronization updates pushed from the network management server 20, the location server may notify other "listening" network management servers of the synchronization updates. In this manner, synchronization of design models between network management servers is facilitated.

Figure 6:
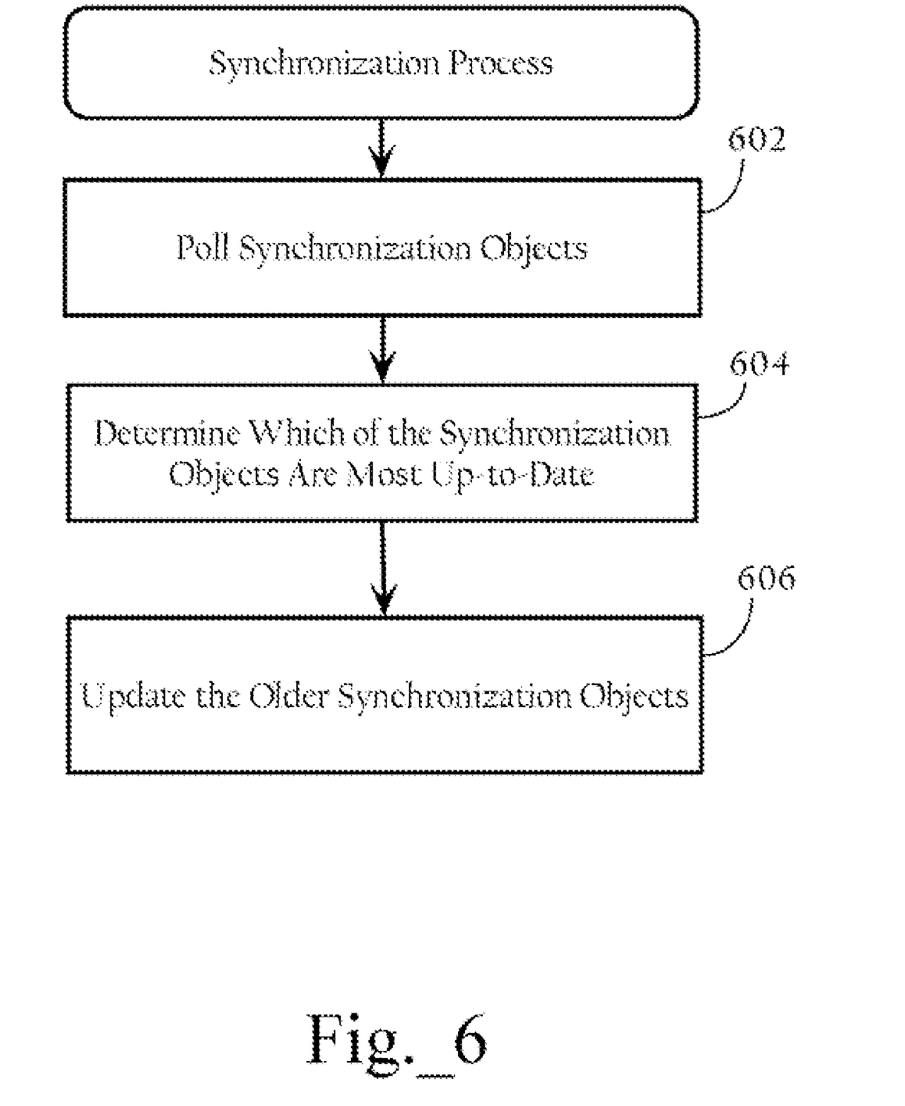
FIG. 6 illustrates another example method implemented at a network management server.

FIG. 6 illustrates an example method associated with synchronization implemented at a network management server 20. As FIG. 6 shows, network management server 20 polls synchronization objects (e.g., physical configuration mappings, logical configuration mappings, network designs, location servers, etc.) (602). Network management server 20 then determines which of the synchronization objects are current or most up-to-date (604). In implementation, the determination may be based on time stamps associated with the objects. Network management server 20 then updates the older synchronization objects (606). In one implementation, the network management server 20 may also merge the object changes so that the network management server 20 does not overwrite non-conflicting changes, rather than blindly overwriting one of them based on timestamps. For example, if object A attribute B on location server and object A' attribute C on the network management server 20 have changed, then both changes may be merged into object A+attribute B+attribute C on both systems.

In one implementation, the network management server 20 may synchronize the logical configuration mappings and corresponding physical configuration mappings manually (e.g., upon receiving a synchronization command from an administrator) or automatically, In one implementation, if the network management server detects a change in the physical position of a wireless access point, the network management server may automatically synchronize the physical configuration mappings and logical configuration mappings. In one implementation, various triggers for automatic synchronization may include, for example, when a wireless access point moves to a new physical location, is removed from the network, or experiences a power disruption, etc.

D.1. Synchronization Algorithm

In one implementation, the network management server may transmit/push top-level objects (e.g., network designs, even objects, etc.) to the location servers or receive/pull top-level objects from the location servers, including any updates to the physical configuration mappings, to appropriate location servers that need to be updated. In one implementation, network management server 20 determines which location servers need to be updated based on whether the changes affect objects associated with particular location servers. In one implementation, objects may also be pulled from location servers to the network management server. In one implementation, whether an object is pushed or pulled, the full object tree including all if its child objects are pushed/pulled. In one implementation, child objects may include RF coverage maps, buildings, floors, etc.

In one implementation, one or more of the following rules may be applied. In one implementation, if an object exists only on the network management server and is assigned to one or more location servers, that object may be pushed (e.g., using a Simple Object Access Protocol (SOAP) or Extensible Markup Language (XML) Web Services Interface. In one implementation, if an object exists only on a location server, that object may be pulled and constructed on the network management server. In one implementation, if an object exists on the network management server and a location server, but the network design mappings and central controller mappings are not synchronized, the newer of the two versions is either pushed or pulled. Accordingly, if the network management server has the newer version, the network management server pushes the object to the location server. If the location server has the newer version, the network management server pulls the object into the network management server and updates the network design mapping. The network management server may utilize an appropriate time-object synchronization algorithm to ensure which objects are the most current or up-to-date.

In one implementation, once the network design and central controller mappings are created, the network management server may provide a user interface and back-end implementation that performs the synchronization using SOAP/XML interfaces on the location servers. The user interface may also provide status and progress information as each object gets synchronized. In one implementation, if any objects fail synchronization, the wireless network server may show an error and a reason for the error.

In one implementation, as FIG. 1A shows, multiple network management servers 20a and 20b could manage a common set of location servers, as well as networks that are mapped to those location servers. In one implementation, if one of the network management servers makes changes on a given location server during a synchronization process, the second network management server may detect that change on the location server and pull that change into its database directly from the location server. This allows distributed network management servers to stay synchronized even if there is no direct link between them.

E. Example Screenshots

Figure 7:
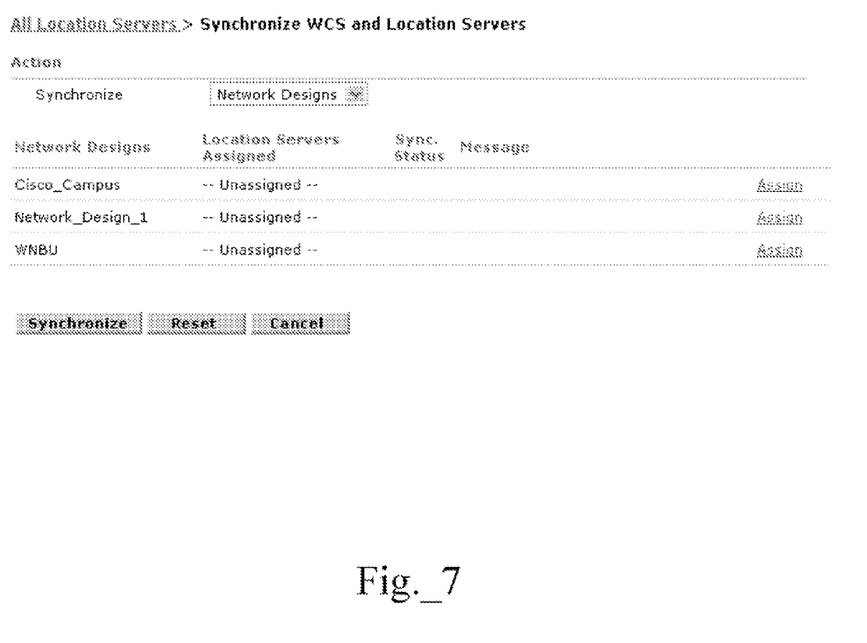
FIG. 7 illustrates an example screenshot showing a list of network designs.
Figure 8:
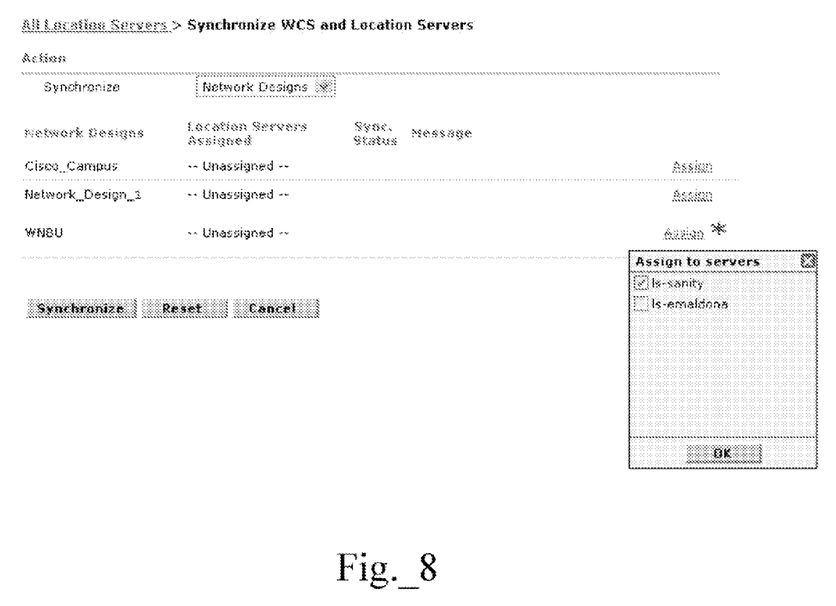
FIG. 8 illustrates another example screenshot showing a list of network designs and a list of available location servers.
Figure 9:
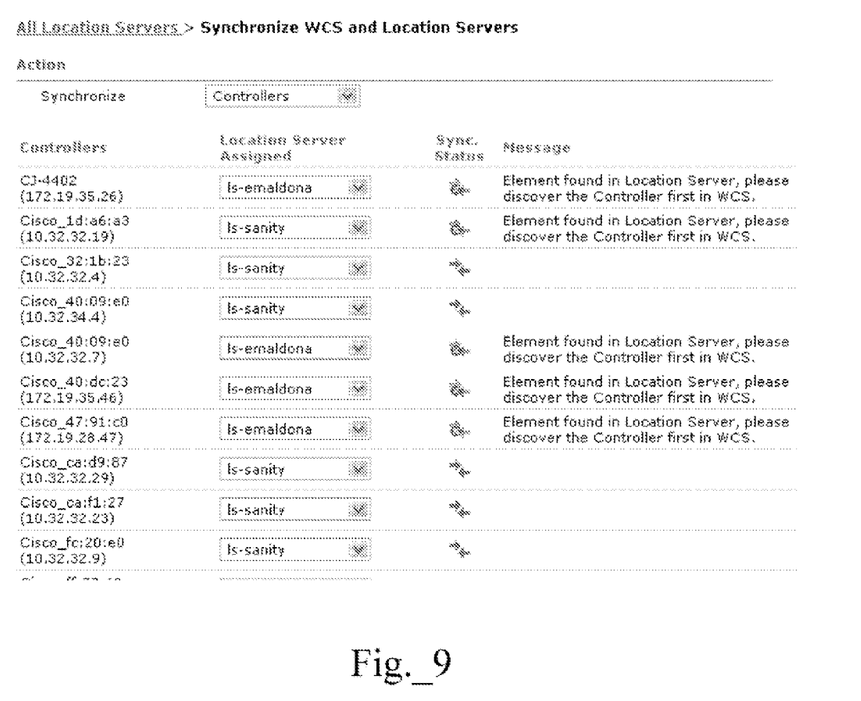
FIG. 9 illustrates another example screenshot showing a mapping of central controllers to location servers.

The following are example screenshots illustrating aspects of the embodiments described above. FIG. 7 illustrates an example screenshot showing a list of network designs. As FIG. 7 shows, the network designs may be initially unassigned to location servers. FIG. 8 illustrates another example screenshot showing a list of available location servers that is displayed when a user clicks on an "Assign" button associated with one of the network designs. From the list of available location servers, the user may select one or more location servers to be assigned to the respective network design. FIG. 9 illustrates another example screenshot showing a mapping of central controllers to location servers, which may result from the synchronization process, described above.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. A method comprising:
   storing, in a data store, a physical network model of a network environment, the network environment comprising one or more central controllers and one or more access points each operative to associate with a central controller, the physical network model comprising one or more region objects, each region object corresponding to a physical region of the network environment, each region object further including one or more radio frequency (RF) coverage maps, each RF coverage map defining a location of one or more access points and RF properties of a physical space;
   accessing, by a network management server, a first mapping definition that defines a first operational association between a location server and one or more region objects of the physical network model, wherein the location server is operative to track and provide location information associated with one or more network stations;
   accessing, by the network management server, a second mapping definition that defines a second operational association between the location server and one or more central controllers;
   transmitting, by the network management server, the one or more region objects in the first mapping definition to the location server; and
   configuring, by the network management server, the location server and the one or more central controllers in the second mapping definition to interoperate.

2. The method of claim 1 further comprising monitoring the location server.

3. The method of claim 1 further comprising synchronizing, based on the first mapping definition, the physical network model stored in the data store and the physical network model stored on the location server.

4. The method of claim 1 further comprising pushing the synchronized physical network model to one or more location servers.

5. The method of claim 1 further comprising mapping the physical network model to one or more location servers, wherein the physical network model comprises one or more region objects and one or more objects that are children of the region objects, one of the child objects comprising an RF coverage map.

6. The method of claim 5 wherein at least one child object comprises buildings and floors.

7. The method of claim 5 further comprising pushing synchronization updates to one or more location servers based on the mapping.

8. The method of claim 7 wherein when a location server detects a synchronization update pushed from the wireless network infrastructure node, the location server notifies other wireless network infrastructure nodes of the synchronization update.

9. The method of claim 1 further comprising mapping one or more location server objects to one or more central controller objects.

10. The method of claim 1 further comprising determining which synchronization objects most up-to-date based on time stamps associated with the synchronization objects.

11. The method of claim 1 wherein the synchronizing of the physical network can be manually triggered or automatically triggered.

12. Logic encoded in one or more tangible media for execution and when executed operable to:
   store, in a data store, a physical network model of a network environment, the network environment comprising one or more central controllers and one or more access points each operative to associate with a central controller, the physical network model comprising one or more region objects, each region object corresponding to a physical region of the network environment, each region object further including one or more radio frequency (RF) coverage maps, each RF coverage map defining a location of one or more access points and RF properties of a physical space;

access a first mapping definition that defines a first operational association between a location server and one or more region objects of the physical network model, wherein the location server is operative to track and provide location information associated with one or more network stations;

access a second mapping definition that defines a second operational association between the location server and one or more central controllers;

transmit the one or more region objects in the first mapping definition to the location server; and configure the location server and the one or more central controllers in the second mapping definition to interoperate.

13. The logic of claim 12 wherein the logic is further operable to monitor the location server.

14. The logic of claim 12 wherein the logic is further operable to synchronize, based on the first mapping definition, the physical network model stored in the data store and the physical network model stored on the location server.

15. The logic of claim 12 wherein the logic is further operable to push the synchronized physical network model to one or more location servers.

16. The logic of claim 12 wherein the logic is further operable to map the physical network model to one or more location servers, wherein the physical network model comprises one or more region objects and one or more objects that are children of the region objects, one of the child objects comprising an RF coverage map.

17. The logic of claim 16 wherein at least one child object comprises buildings and floors.

18. The logic of claim 16 wherein the logic is further operable to push synchronization updates to one or more location servers based on the mapping.

19. The logic of claim 18 wherein when a location server detects a synchronization update pushed from the wireless network infrastructure node, the location server notifies other wireless network infrastructure nodes of the synchronization update.

20. The logic of claim 12 wherein the logic is further operable to map one or more location server objects to one or more central controller objects.

21. The logic of claim 12 wherein the logic is further operable to determine which synchronization objects most up-to-date based on time stamps associated with the synchronization objects.

22. The logic of claim 12 wherein the synchronizing of the physical network can be manually triggered or automatically triggered.

23. A system comprising:

a wireless network infrastructure node operable to store, in a data store, a physical network model of a network environment, the network environment comprising one or more central controllers and one or more access points each operative to associate with a central controller, the physical network model comprising one or more region objects, each region object corresponding to a physical region of the network environment, each region object further including one or more radio frequency (RF) coverage maps, each RF coverage map defining a location of one or more access points and RF properties of a physical space; access a first mapping definition that defines a first operational association between a location server and one or more region objects of the physical network model, wherein the location server is operative to track and provide location information associated with one or more network stations; receive a second mapping definition that defines a second operational association between the location server and one or more central controllers; transmit the one or more region objects in the first mapping definition to the location server; and configure the location server and the one or more central controllers in the second mapping definition to interoperate; and one or more location servers operable to communicate with the wireless network infrastructure node.

* * * * *